US008040087B2

(12) United States Patent
Hsu et al.

(10) Patent No.: US 8,040,087 B2
(45) Date of Patent: Oct. 18, 2011

(54) CONTROL DEVICES AND METHODS

(75) Inventors: Che-Wei Hsu, Changhua County (TW); Chi-Lin Hsu, Taipei County (TW)

(73) Assignee: Princeton Technology Corporation, Hsin Tien, Taipei County (TW)

( * ) Notice: Subject to any disclaimer, the term of this patent is extended or adjusted under 35 U.S.C. 154(b) by 457 days.

(21) Appl. No.: 12/248,653

(22) Filed: Oct. 9, 2008

(65) Prior Publication Data

US 2009/0195196 A1 Aug. 6, 2009

(30) Foreign Application Priority Data

Jan. 31, 2008 (TW) .................................. 97103677 A

(51) Int. Cl.
 *H02P 6/16* (2006.01)
(52) U.S. Cl. ............... 318/400.04; 318/400.01; 318/615; 318/667; 361/236; 388/923; 700/56; 700/57; 700/59; 700/63; 700/188
(58) Field of Classification Search ............. 318/400.04, 318/400.01, 615, 667; 361/236–244; 388/923–934; 700/56, 57, 59, 63, 188, 61, 67, 69, 75, 78
See application file for complete search history.

(56) References Cited

U.S. PATENT DOCUMENTS

| 3,668,414 | A | * | 6/1972 | Norian et al. ................. 307/104 |
| 3,769,555 | A | * | 10/1973 | Dolbachian et al. ....... 318/254.1 |
| 3,906,320 | A | * | 9/1975 | Doemen ................... 318/400.04 |
| 3,986,086 | A | * | 10/1976 | Muller ....................... 318/400.41 |
| 3,988,652 | A | * | 10/1976 | Endo et al. ................ 318/400.17 |
| 4,097,788 | A | * | 6/1978 | Nygaard et al. ............... 318/271 |
| 4,317,072 | A | * | 2/1982 | Goof et al. ............... 318/400.04 |
| 4,368,411 | A | * | 1/1983 | Kidd ......................... 318/400.09 |
| 4,393,339 | A | * | 7/1983 | Kimura ..................... 318/400.05 |
| 4,472,666 | A | * | 9/1984 | Akeda et al. .............. 318/400.21 |
| 4,473,781 | A | * | 9/1984 | Nielsen ..................... 318/400.31 |
| 4,494,052 | A | * | 1/1985 | Kelleher et al. .......... 318/400.11 |
| 4,544,868 | A | * | 10/1985 | Murty ....................... 318/400.11 |
| 4,620,138 | A | * | 10/1986 | Muller ........................ 318/400.2 |
| 4,804,892 | A | * | 2/1989 | Muller ....................... 318/400.17 |
| 5,814,965 | A | * | 9/1998 | Randall ........................... 318/701 |
| 5,923,141 | A | * | 7/1999 | McHugh ........................ 318/701 |
| 6,051,942 | A | * | 4/2000 | French ......................... 318/254.1 |
| 6,548,981 | B1 | * | 4/2003 | Ishii et al. ....................... 318/538 |

* cited by examiner

*Primary Examiner* — Rita Leykin

(74) *Attorney, Agent, or Firm* — Muncy, Geissler, Olds & Lowe, PLLC

(57) ABSTRACT

A control device for driving a motor which includes a rotor and a stator is provided. The control device includes a Hall detector and driving circuit. The Hall detector detects magnetic flux variation when the rotor rotates and generates a first detection signal and a second detection signal. The first and second detection signals represent current rotation location when the rotor rotates. The driving circuit generates a driving signal to drive the stator. The driving circuit turns on or off the driving signal according to a control signal and the relationship between the first and second detection signals.

19 Claims, 5 Drawing Sheets

CONTROL DEVICES AND METHODS

CROSS REFERENCE TO RELATED APPLICATIONS

This application claims the benefit of Taiwan application Serial No. 97103677 filed Jan. 31, 2008, the subject matter of which is incorporated herein by reference.

BACKGROUND OF THE INVENTION

1. Field of the Invention

The invention relates to a control device and method, and more particularly to a control device and method for a motor.

2. Description of the Related Art

For conventional control methods for brushless motors, a pulse width modulation (PWM) signal is used to control a driving circuit which further provides current to a stator of a motor, so that polarities are generated in the stator. The motor rotates by the influence of a rotor with a permanent magnet and the stator with the polarities. When the motor rotates to a predetermined angle, the polarities of the stator are changed, and the motor continuously rotates. By providing the PWM signal to the driving circuit and continuously changing the polarities of the stator, the motor can unceasingly rotate. However, because a PWM is continuously provided to the driving circuit, power consumption of the driving circuit is increased. Additionally, when the polarities of the stator are changed, surge current is generated due to the switch operation of the driving circuit, degrading efficiency of the driving circuit.

It is desired to provide a control device and method for a motor, which can improve efficiency and save power of a driving circuit by controlling the switching of a PWM signal.

BRIEF SUMMARY OF THE INVENTION

Control devices are provided. An exemplary embodiment of a control device is used for driving a motor which comprises a rotor and a stator. The control device comprises a Hall detector and driving circuit. The Hall detector detects magnetic flux variation when the rotor rotates and generates a first detection signal and a second detection signal. The first and second detection signals represent current rotation location when the rotor rotates. The driving circuit generates a driving signal to drive the stator. The driving circuit turns on or off the driving signal according to a control signal and the relationship between the first and second detection signals.

Control methods are provided. An exemplary embodiment of a control method used for driving a motor is provided, which comprises a rotor and a stator. The control method comprises: providing a driving signal; turning on the driving signal to drive the stator when a first terminal of the rotor is at a base point; and turning off the driving signal when the first terminal of the rotor is at a first specific point by moving from the base point. In some embodiments, the control method further comprises: turning on the driving signal when the first terminal of the rotor is at a divided point; and turning off the driving signal when the first terminal of the rotor is at a second specific point by moving from the divided point.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
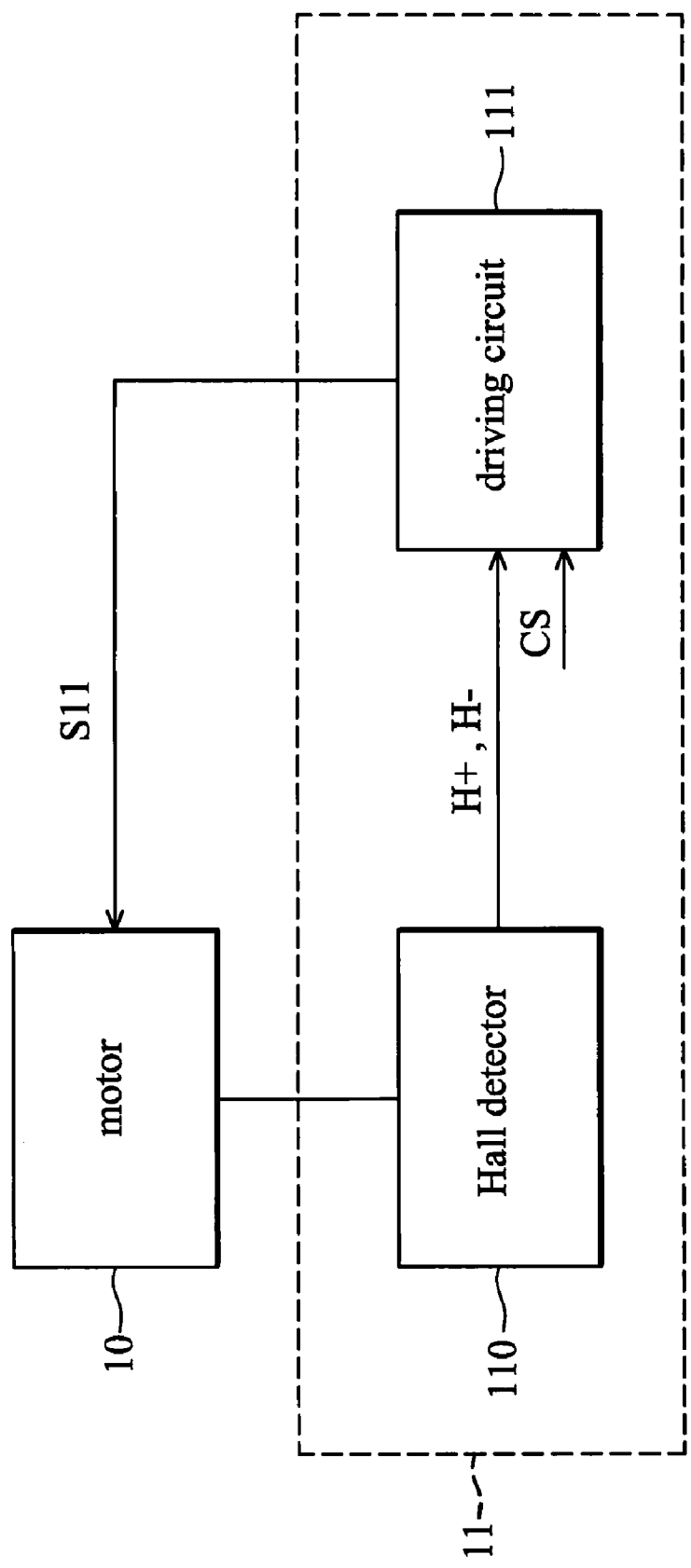
FIG. 1 shows an exemplary embodiment of a control device.

Control devices and methods are provided. In an exemplary embodiment of a control device shown in FIG. 1, a control device 11 is used to drive a motor 10 and comprises a Hall detector 110 and a driving circuit 111. One of ordinary skill in the art should know that a motor comprises a rotor and a stator. The Hall detector 110 detects magnetic flux variation when the rotor of the motor 10 rotates and generates a first detection signal H+ and a second detection signal H− according to the detected magnetic flux variation. The first detection signal H+ and the second detection signal H− are differential signals and represent a rotation angle range of the rotator. For example, according to a base point, the rotation angle of the rotator is between 0 and 180 degrees or between 180 and 360 degrees. The driving circuit 111 receives the first detection signal H+ and the second detection signal H− and a control signal CS and generates a driving signal S11 to drive the motor 10. The driving circuit 111 turns on or off the driving signal S11 according the control signal CS and the relationship between the first detection signal H+ and the second detection signal H−. The detailed operation of turning on and off the driving signal S11 by the control device 11 is described in following.

Figure 2:
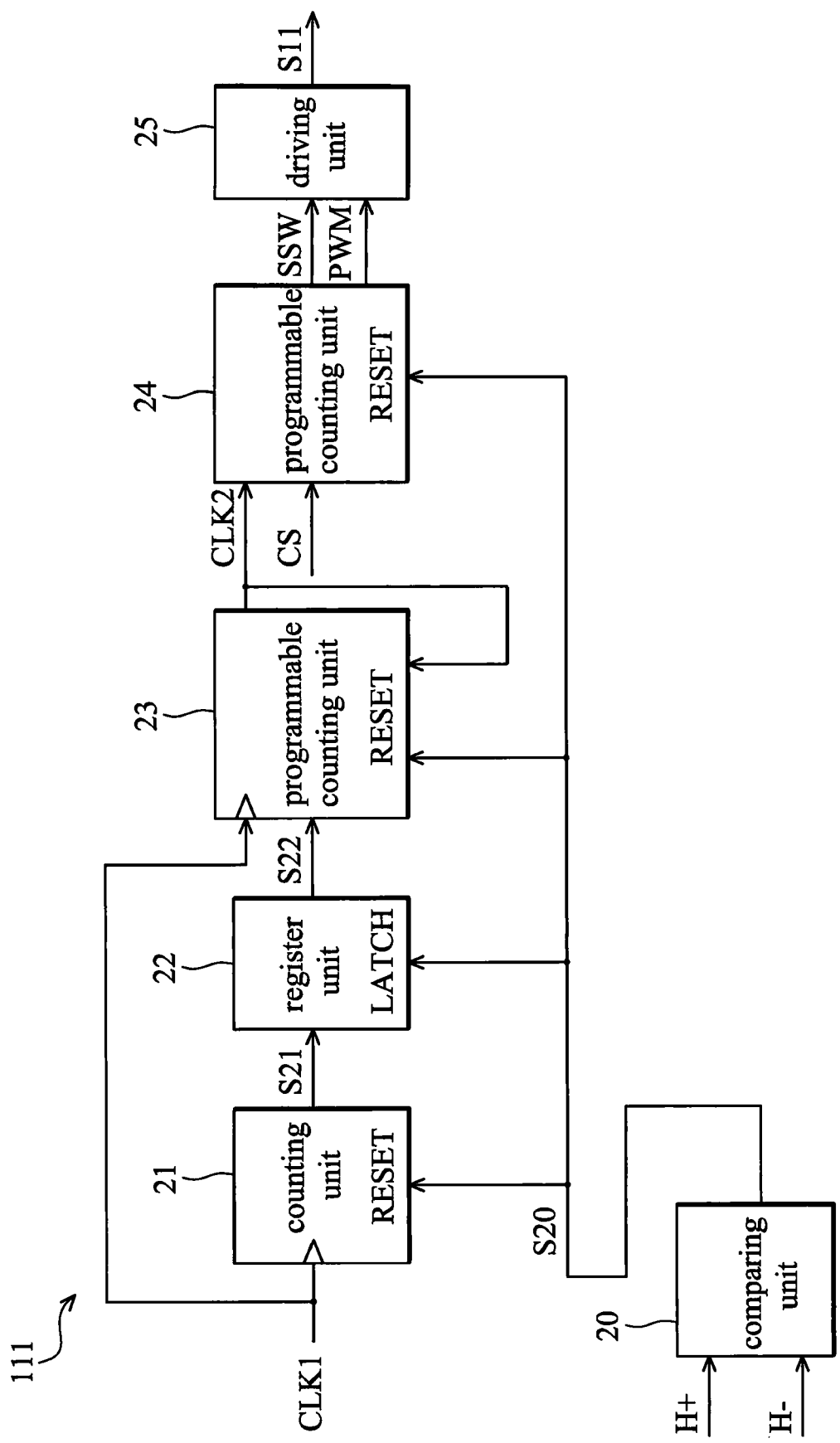
FIG. 2 depicts an exemplary embodiment of the driving circuit.
Figure 3:
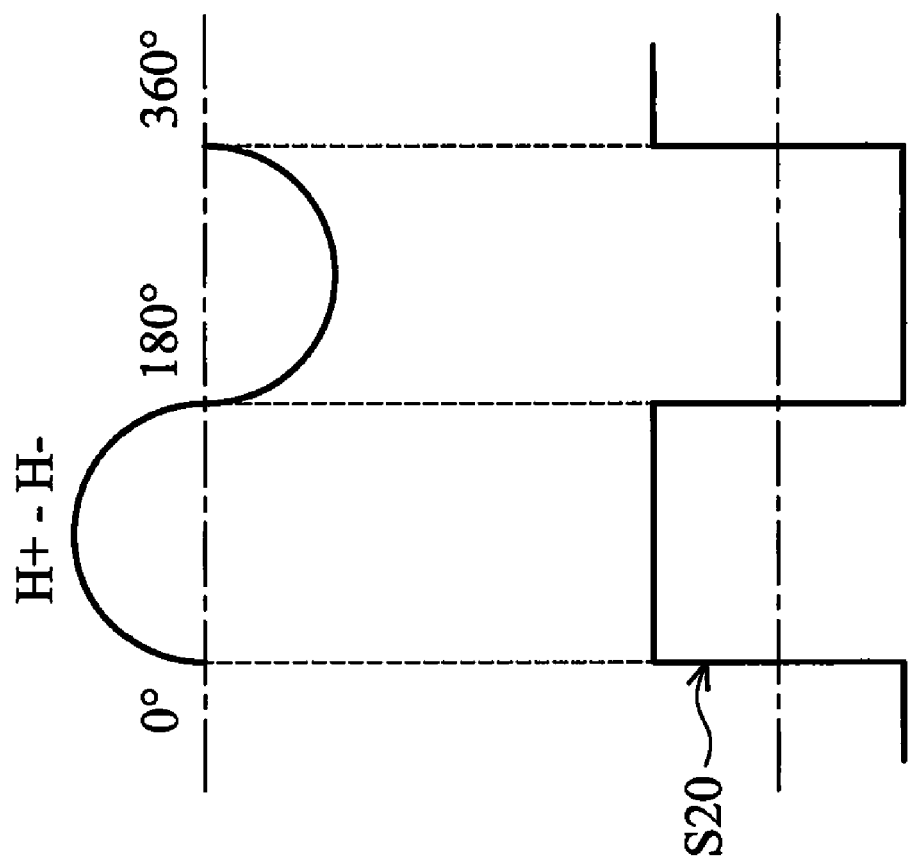
FIG. 3 shows a difference signal H+-H− between the first detection signal H+ and the second detection signal H− and the determination signal S20.

FIG. 2 depicts an exemplary embodiment of the driving circuit. Referring to FIG. 2, the driving circuit 111 comprises a comparing unit 20, a counting unit 21, a register unit 22, first and second programmable counting units 23 and 24, and a driving unit 25. The comparing unit 20 receives and compares the first and second detection signals H+ and H−. The comparing unit 20 generates a determination signal S20 according to the compared result. FIG. 3 shows a difference signal H+-H− between the first detection signal H+ and the second detection signal H− and the determination signal S20. A base point is defined. Referring to FIG. 3, when the rotation angle of the rotator is between 0 and 180 degrees, the first detection signal H+ is larger than the second detection signal H−. A difference signal H+-H− which is obtained by subtracting the second detection signal H− from the first detection signal H+ is positive, and the determination signal S20 has a high level. When the rotation angle of the rotator is between 180 and 360 degrees, the first detection signal H+ is less than the second detection signal H−. The difference signal H+ -H− is negative, and the determination signal S20 has a low level.

The counting unit 21 receives a clock signal CLK1 and the determination signal S20 and is reset (RESET) according to the transition of the determination signal S20, that is according to the rising or falling edge of the determination signal S20. The counting unit 21 counts by the clock signal CLK1 and performs a division operation to the counted result and a coefficient to generate a counting signal S21. In other words, the counting unit 21 calculates required time periods when the rotation angle of the rotator is between 0 and 180 degrees and between 180 and 360 degrees, and then the duty cycle of the determination signal S20 is obtained. In this embodiment, after obtaining the counting signal S21, the counting unit 21 is reset (RESET) according to the transition of the determination signal S20, delayed by one work clock.

When the determination signal S20 is transited (that is when the rising or falling edge of the determination signal S20 appears), the register unit 22 latches and stores the counting signal S21. The first programmable counting unit 23 receives a stored counting signal S22 from the register unit 22 and counts by the clock signal CLK1 to generate a clocks signal CLK2. The period of the clock signal CLK2 is equal to S22*$T_{CLK1}$, wherein $T_{CLK1}$ represents the period of the clock signal CLK1. The first programmable counting unit 23 is reset (RESET) according to the transition of the determination signal S20 or the clock signal CLK2. The second programmable counting unit 24 receives the control signal CS and counts the control signal CS by the clock signal CLK2 to generate a switch signal SSW. The second programmable counting unit 24 is reset according to the transition of the detection signal S29. The switch signal SSW is at a low level when the second programmable counting unit 24 is reset and then changes to at a high level when over-flow occurs in the second programmable counting unit 24. The driving unit 25 triggers a pulse width modulation signal PWM to generate the driving signal S11 according to the switch signal SSW. When the switch signal SSW is at a low level, the PWM signal is provided to the driving unit 25; and when the switch signal SSW is at a high level, the PWM signal is not provided to the driving unit 25.

In some embodiments, there is a power element (not shown in FIG. 2) between the motor 10 and the driving circuit 11. The power element generates driving current to the motor 10 according to the driving signal S11, thereby controlling the polarities of the stator of the motor 10. In other embodiments, the power element is implemented by a power MOS transistor.

Figure 4:
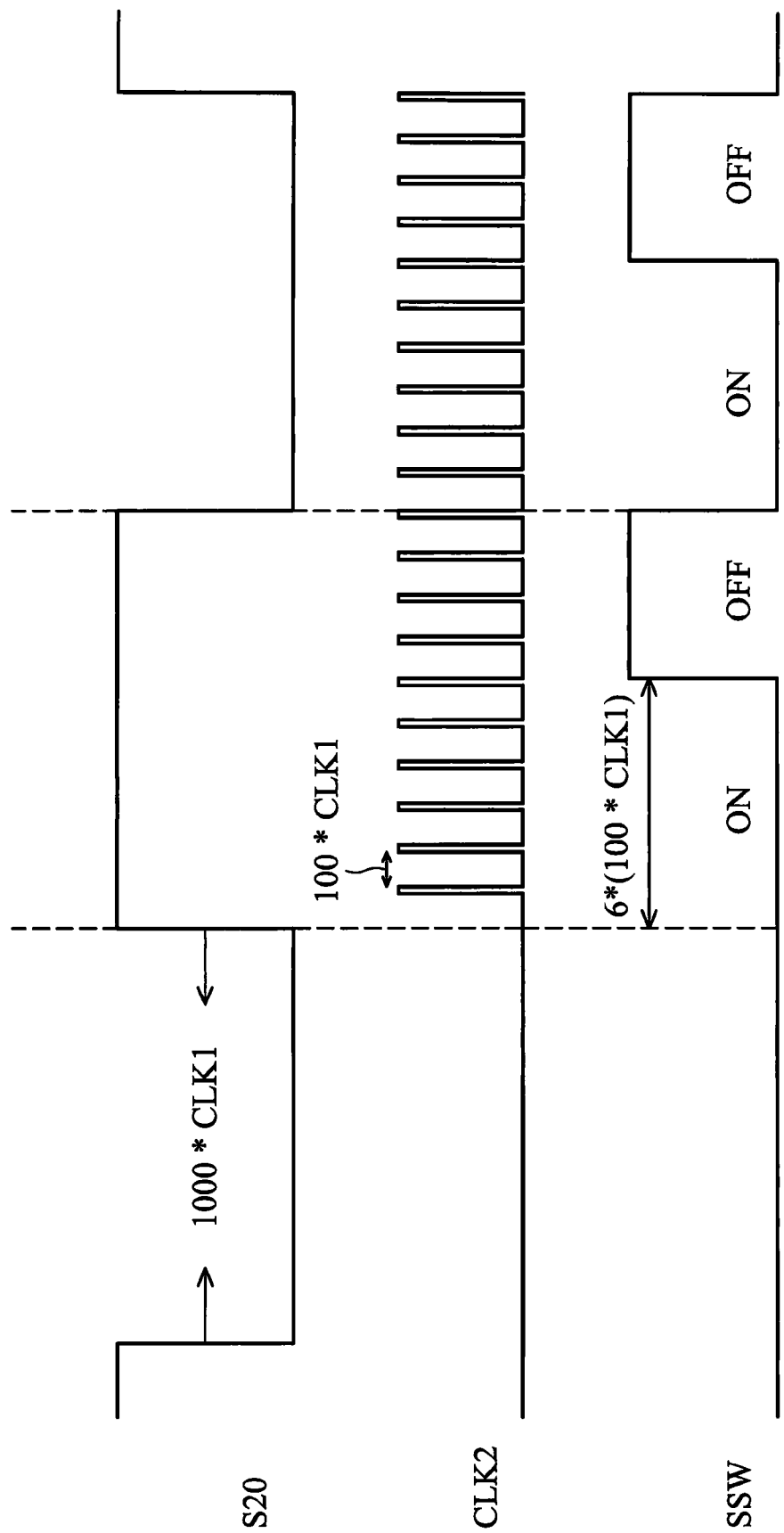
FIG. 4 shows the determination signal S20, the clock signal CLK2, and the switch signal SSW.
Figure 5B:
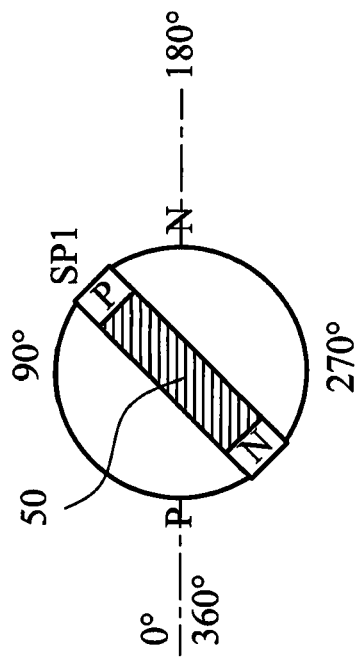
FIGS. 5a-5d show the rotation states of the rotor of the motor 20.
Figure 5C:
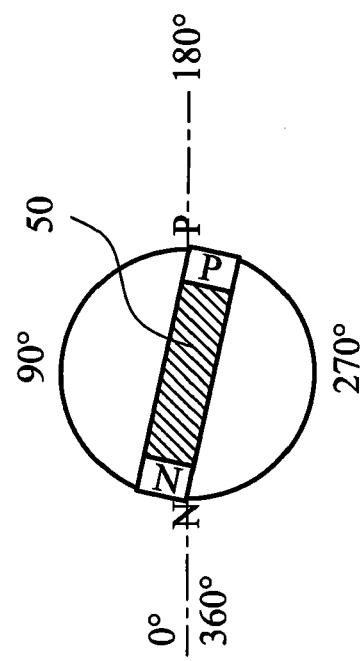
Figure 5A:
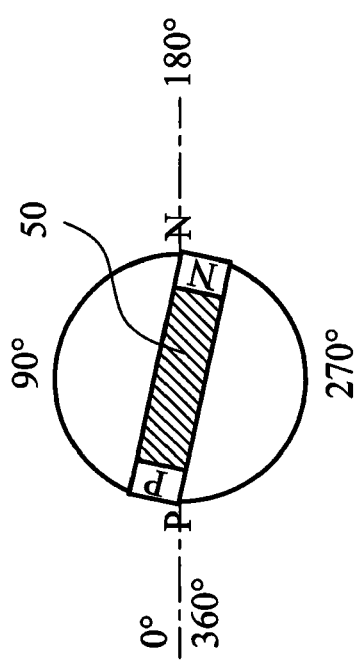
Figure 5D:
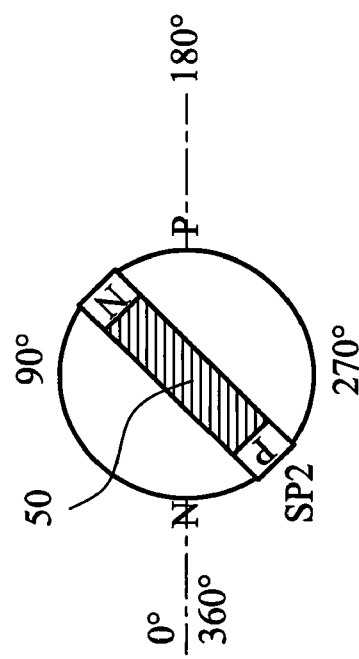

FIG. 4 shows the determination signal S20, the clock signal CLK2, and the switch signal SSW. Referring to FIG. 4, it is assumed that the counting unit 21 counts the determination signal S20 according to the clock signal CLK1 to obtain whether the high or low level of the determination signal S20 has 1000 clock signal CLK1, that is the counted result is equal to 1000. The counting unit 21 divides the counted result by a coefficient N to obtain the counting signal S21. In this embodiment, the coefficient N is set as 10, thus the value represented by the counting signal S21 is 100 (1000/10=100). The counting signal S21 is temporarily stored in the register unit 22 and then output to serve as the counting signal S22. The first programmable counting unit 23 receives the counting signal S22 stored in the register unit 22 and counts the counting signal S22 by the clock signal CLK1. When the first programmable counting unit 23 counts to 100, the first programmable counting unit 23 outputs a signal with a high level to serve as the clock signal CLK2. Before the determination signal S20 is transited again, the first programmable counting unit 23 is reset according to the feedback clock signal CLK2 for starting a new count. In other words, the first programmable counting unit 23 starts a new count when over-flow occurs in the clock signal CLK2 or the first programmable counting unit 23 counts to over 100. The second programmable counting unit 24 counts the control signal CS by the clock signal CLK2. The value represented by the control signal CS is between 0 and N−1, in this embodiment, it is assumed that the value represented by the control signal CS is 6. The second programmable counting unit 24 generates the switch signal SSW with a low level in the beginning. When the second programmable counting unit 24 counts to over 6, the switch signal SSW is changed to a high level. The driving unit 25 receives the switch signal SSW and triggers the PWM signal to generate the driving signal S11 according to the switch signal SSW. The driving unit 25 generates the driving signal S11 according to the switch signal SSW with the low level ("ON" state) and stops generating the driving signal S11 according to the switch signal SSW with the high level ("OFF" state). Wherein, when the driving unit 25 strops generating the driving signal S11 is determined by the control signal CS, and the control signal CS is determined according to system requirements.

FIGS. 5a-5d show the rotation states of the rotor of the motor 20. The operation of turning on and off the driving signal S11 is described by using the rotation angle of a rotator 50 of the motor 10. The rotation order of the rotor is from FIG. 5a to FIG. 5d. A base point is defined as 0 degrees, and a divided point is defined as 180 degrees. The rotator 50 is a permanent magnet and has a positive terminal (P) and a negative terminal (N). During the positive terminal (P) of the rotator 50 moves from the base point to the divided point, that is when the rotation angle of a rotator 50 is between 0 to 180 degrees, the first detection signal H+ is larger than the second detection signal H−, and the determination signal S20 has a high level. Moreover, the stator of the motor 10 generates a positive polarity (P) at the base point and a negative polarity (N) at the divided point. When the determination signal S20 is at the high level, by the above operations of the counting unit 21, the register unit 22, and the first and second programmable counting unit 23 and 24, the second programmable counting unit 24 generates the switch signal SSW according to the control signal CS. When the positive terminal (P) of the rotator 50 is at the base point, the driving unit 25 generates the driving signal S11 according to the switch signal SSW with a low level. When the positive terminal (P) of the rotator 50 moves to a specific point SP1, the driving unit 25 stops generating the driving signal S1 according to the switch signal SSW with a high level. In this embodiment, when the positive terminal (P) of the rotator 50 moves from the base point to the specific point SP1, the rotator 50 rotates about 120-135 degrees. In some embodiments, the specific point SP1 can be in a range between 90 and 180 degrees according to different applications. The specific point SP1 between 120 and 135 degrees in this embodiment is given as an example, without limitation. When the driving unit 25 stops generating the driving signal S11, the rotator 50 can rotate continuously by the inertia between the positive terminal (P) of the rotor 50 and the negative polarity (N) of the stator at the divided point.

When the positive terminal (P) of the rotator 50 moves from the divided point back to the base point, that is when the rotation angle of the rotator 50 is between 180 to 360 degrees, the first detection signal H+ is less than the second detection signal H−, and the determination signal S20 has a low level. Moreover, the stator of the motor 10 generates a negative polarity (N) at the base point and a positive polarity (P) at the divided point. When the determination signal S20 is at the low level, by the above operations of the counting unit 21, the register unit 22, and the first and second programmable counting unit 23 and 24, the second programmable counting unit 24 generates the switch signal SSW according to the control signal CS. When the positive terminal (P) of the rotator 50 is at the divided point, the driving unit 25 generates the driving signal S11 according to the switch signal SSW with the low level. When the positive terminal (P) of the rotator 50 moves to a specific point SP2, the driving unit 25 stops generating the driving signal S11 according to the switch signal SSW with the high level. In this embodiment, when the positive terminal (P) of the rotator 50 moves from the base point to the specific point SP2, the rotator 50 rotates about 300-315 degrees. In some embodiments, the specific point SP2 can be in a range between 270 and 360 degrees according to different applications. The specific point SP2 between 300 and 315 degrees in this embodiment is given as an example, without limitation. When the driving unit 25 strops generating the driving signal S11, the rotator 50 can rotate continuously by the inertia between the positive terminal (P) of the rotor 50 and the negative polarity (N) of the stator at the base point.

According the above description, the control signal CS determines when the driving unit 25 turns off the driving signal S11. In other words, the control signal CS determines the positions of the specific points SP1 and SP2. Thus, the timing when the driving unit 25 turns off the driving signal S11 can be determined by adjusting the value represented by the control signal CS.

In the embodiments of the invention, the driving unit 25 turns on the driving signal S11 first and then turns off the driving signal S11 when the rotor of the motor 10 rotates by a predetermined angle. The rotor rotates continuously by the rotation inertia. When the rotation inertia disappears, the driving unit 25 turns on the driving signal S11 again. Thus, the driving unit 25 does not provide a continuous driving signal S11, and saves power. Moreover, the PWM signal is turned off before the polarities of the stator are changed, reducing current surge generated during switch operation of a driving circuit, thus improving efficiency of the driving circuit.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control device for driving a motor which comprises a rotor and a stator, the control device comprising:
    a Hall detector detecting magnetic flux variation when the rotor rotates and generating a first detection signal and a second detection signal, wherein the first and second detection signals represent current rotation location when the rotor rotates; and
    a driving circuit generating a driving signal to drive the stator and turning on or off the driving signal according to a control signal and the relationship between the first and second detection signals; wherein the driving circuit comprises:
        a comparing unit comparing the first and second detection signals and generating a determination signal according to the compared result;
        a counting unit receiving a first clock signal and the determination signal, counting according to the first clock signal, and reset according to transition of the determination signal, wherein the counting unit performs a division operation to the counted result and a first coefficient to generate a counting signal;
        a register unit receiving and temporarily storing the counting signal and reset according to the transition of the determination signal;
        a first programmable counting unit counting the counting signal by the first clock signal to generate a second clock signal and reset according to the transition of the determination signal or the second clock signal;
        a second programmable counting control signal and counting the control signal by the second clock signal to generate a switch signal, wherein the second programmable counting unit is reset according to the transition of the determination signal; and
        a driving unit, generating the driving signal according to a pulse width modulation (PWM) signal and storming generation of the driving signal according to the switch signal.

2. The control device as claimed in claim 1, wherein when a first terminal of the rotor moves from a base point to a divided point, the driving circuit generates a determination signal with a first level when the first detection signal is larger than the second detection signal, and wherein when the first terminal of the rotor moves from the divided point to the base point, the driving circuit generates the determination signal with a second level when the first detection signal is less than the second detection signal.

3. The control device as claimed in claim 2, wherein when the determination signal is at the first level, according to the control signal, the driving circuit turns on the driving signal when the first terminal of the rotor is at the base point and turns off the driving signal when the first terminal of the rotor is at a first specific point.

4. The control device as claimed in claim 3, wherein the base point is defined as 0 degrees, and the rotor rotates about 120-135 degrees when the first terminal of the rotor moves from the base point to the first specific point.

5. The control device as claimed in claim 3, wherein when the determination signal is at the second level, according to the control signal, the driving circuit turns on the driving signal when the first terminal of the rotor is at the divided point and turns off the driving signal when the first terminal of the rotor is at a second specific point.

6. The control device as claimed in claim 5, wherein the base point is defined as 0 degrees, and the rotor rotates about 300-315 degrees when the first terminal of the rotor moves from the base point to the second specific point.

7. The control device as claimed in claim 5, wherein positions of the first and second specific points are determined according to the control signal.

8. The control device as claimed in claim 2, wherein the base point is defined as 0 degrees, and the rotor rotates about 180 degrees when the first terminal of the rotor moves from the base point to the divided point.

9. The control device as claimed in claim 1, wherein according to the switch signal, the driving circuit turns on the driving signal when a first terminal of the rotor is at a base point and turns off the driving signal when the first terminal of the rotor is at a first specific point.

10. The control device as claimed in claim 9, wherein the base point is defined as 0 degrees, and the rotor rotates about 120-135 degrees when the first terminal of the rotor moves from the base point to the first specific point.

11. The control device as claimed in claim 9, wherein according to the switch signal, the driving circuit turns on the driving signal when the first terminal of the rotor is at the divided point and turns off the driving signal when the first terminal of the rotor is at a second specific point.

12. The control device as claimed in claim 11, wherein the base point is defined as 0 degrees, and the rotor rotates about 300-315 degrees when the first terminal of the rotor moves from the base point to the second specific point.

13. The control device as claimed in claim 11, wherein the base point is defined as 0 degrees, and the rotor rotates about 180 degrees when the first terminal of the rotor moves from the base point to the divided point.

14. The control device as claimed in claim 11, wherein positions of the first and second specific points are determined according to the control signal.

15. A control method for driving a motor which comprises a rotor and a stator, the control method comprising:
 providing a driving signal according to a control signal;
 turning on the driving signal to drive the stator when a first terminal of the rotor is at a base point; and
 turning off the driving signal when the first terminal of the rotor is at a first specific point by moving from the base point;
 wherein the step of providing the driving signal comprises:
  detecting magnetic flux variation when the rotor rotates to generate a first detection signal and a second detection signal, wherein the first and second detection signals represent current rotation location when the rotor rotates;
  comparing the first and second detection signals and generating a determination signal according to the compared result;
  performing a first counting operation according to a first clock signal, wherein the first counting operation is reset according to transition of the determination signal;
  performing a division operation to the counted result of the first counting operation and a first coefficient to generate a counting signal;
  performing a second counting operation to the counting signal by the first clock signal to generate a second clock signal, wherein the second counting operation is reset according to the transition of the determination signal or the second clock signal;
  performing a third counting operation to the control signal by the second clock signal to generate a switch signal, wherein the third counting operation is reset according to the transition of the determination signal, and a level of the switch signal is changed between a first level and a second level according to the result of the third counting operation; and
  generating the driving signal according to a pulse width modulation (PWM) signal, wherein the driving signal is turned on when the level of the switch signal is the first level, while the driving signal is turned off when the level of the switch signal is the second level.

16. The control method as claimed in claim 15, wherein the base point is defined as 0 degrees, and the rotor rotates about 120-135 degrees when the first terminal of the rotor moves from the base point to the first specific point.

17. The control method as claimed in claim 15 further comprising:
 turning on the driving signal when the first terminal of the rotor is at a divided point; and
 turning off the driving signal when the first terminal of the rotor is at a second specific point by moving from the divided point.

18. The control method as claimed in claim 17, wherein the base point is defined as 0 degrees, and the rotor rotates about 300-315 degrees when the first terminal of the rotor moves from the base point to the second specific point.

19. The control method as claimed in claim 17, wherein the base point is defined as 0 degrees, and the rotor rotates about 180 degrees when the first terminal of the rotor moves from the base point to the divided point.

* * * * *